US011569543B2

(12) United States Patent
Herron et al.

(10) Patent No.: US 11,569,543 B2
(45) Date of Patent: Jan. 31, 2023

(54) BATTERY CASSETTE

(71) Applicant: Proterra Operating Company, Inc., Burlingame, CA (US)

(72) Inventors: Nicholas H. Herron, Pacifica, CA (US); Derek R. Paul, Redwood City, CA (US); Dustin Grace, San Francisco, CA (US)

(73) Assignee: Proterra Operating Company, Inc., Burlingame, CA (US)

( * ) Notice: Subject to any disclaimer, the term of this patent is extended or adjusted under 35 U.S.C. 154(b) by 271 days.

(21) Appl. No.: 17/031,973

(22) Filed: Sep. 25, 2020

(65) Prior Publication Data

US 2021/0098759 A1    Apr. 1, 2021

Related U.S. Application Data

(60) Provisional application No. 62/906,931, filed on Sep. 27, 2019.

(51) Int. Cl.
*H01M 50/278* (2021.01)
*H01M 50/24* (2021.01)
*H01M 50/242* (2021.01)
*H01M 50/258* (2021.01)
*H01M 50/213* (2021.01)
*H01M 50/227* (2021.01)
*H01M 50/276* (2021.01)
*H01M 50/229* (2021.01)

(52) U.S. Cl.
CPC ....... *H01M 50/278* (2021.01); *H01M 50/213* (2021.01); *H01M 50/227* (2021.01); *H01M 50/229* (2021.01); *H01M 50/24* (2021.01); *H01M 50/242* (2021.01); *H01M 50/258* (2021.01); *H01M 50/276* (2021.01)

(58) Field of Classification Search
None
See application file for complete search history.

(56) References Cited

U.S. PATENT DOCUMENTS

| 4,510,215 A | 4/1985 | Adam |
| 2008/0305388 A1* | 12/2008 | Haussman ........ H01M 10/6555 429/120 |
| 2008/0314792 A1 | 12/2008 | Daeschler et al. |
| 2009/0104516 A1* | 4/2009 | Yoshihara ........... H01M 50/502 429/149 |
| 2009/0111015 A1* | 4/2009 | Wood .................. H01M 50/213 429/164 |
| 2009/0233163 A1 | 9/2009 | Fang et al. |
| 2012/0219846 A1* | 8/2012 | Chan ..................... H01M 50/20 429/159 |
| 2017/0125755 A1* | 5/2017 | Kim .................... H01M 50/502 |

FOREIGN PATENT DOCUMENTS

WO    WO 2018045858 A1    12/2008

* cited by examiner

*Primary Examiner* — Gregg Cantelmo
(74) *Attorney, Agent, or Firm* — Bookoff McAndrews, PLLC

(57) ABSTRACT

A battery cassette is disclosed. The battery cassette may include a frame including one or more hollow tubes. The battery cassette may further include a seal component having one or more hollow tubes aligned with the hollow tubes of the frame. The frame and the seal component may be configured to receive one or more battery cells in the hollow tubes.

19 Claims, 14 Drawing Sheets

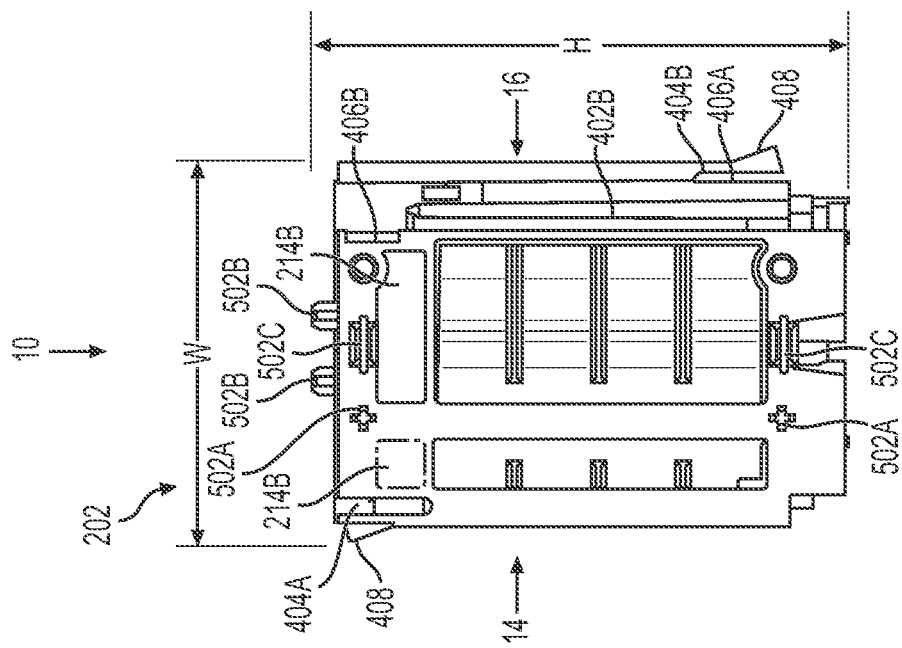
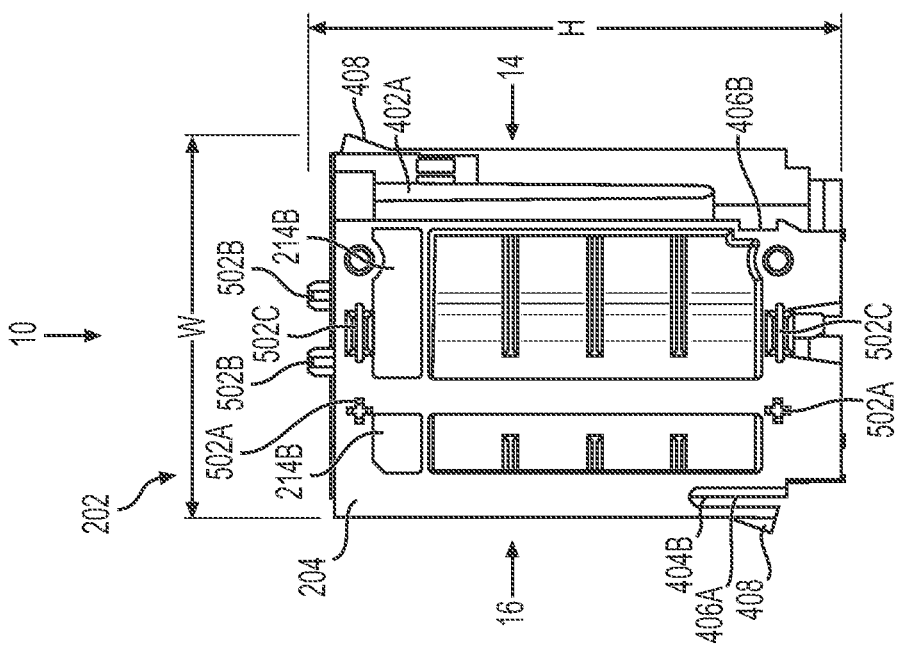

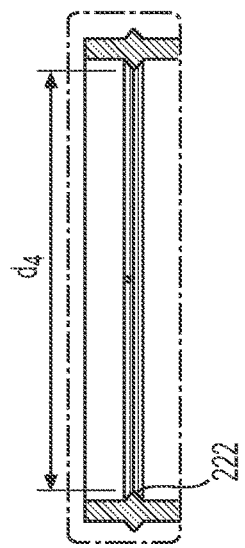
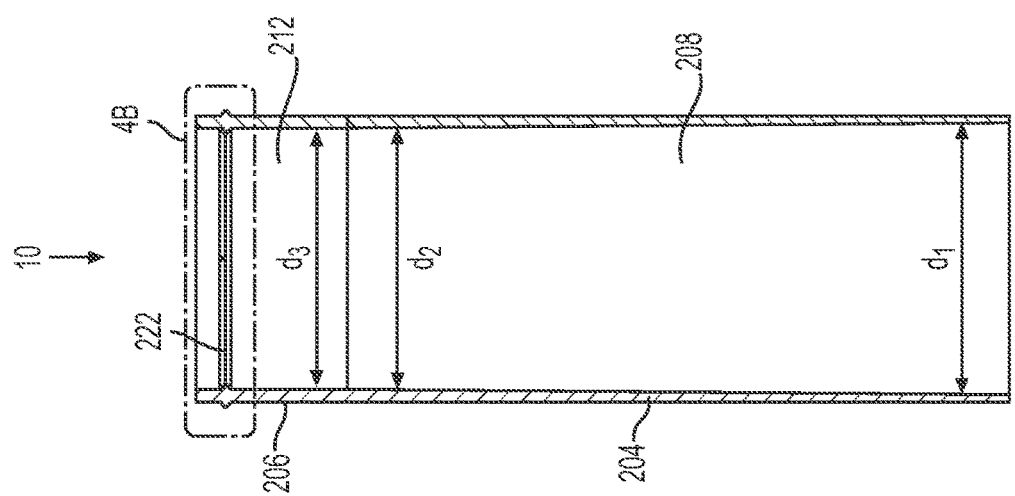

BATTERY CASSETTE

CROSS-REFERENCE TO RELATED APPLICATIONS

This application claims the benefit of U.S. Provisional Application No. 62/906,931, filed Sep. 27, 2019, the disclosure of which is incorporated herein by reference in its entirety.

TECHNICAL FIELD

Embodiments of this disclosure relate to battery systems.

BACKGROUND

An electric vehicle (EV), also referred to as an electric drive vehicle, uses an electric motor for propulsion. Electric vehicles may include all-electric vehicles where the electric motor is the sole source of power, and hybrid electric vehicles that include an auxiliary power source in addition to the electric motor. In an electric vehicle, energy may be stored in a rechargeable battery system that includes multiple battery cells to power the electric motor. The battery system typically includes a plurality of battery packs that each include a plurality of battery modules. Each battery module includes multiple battery cells. Standard battery packs use fixed size modules to create battery packs.

Battery modules are the base building blocks of a battery pack. A battery module includes multiple battery cells connected together in parallel and series. Typically, a battery module is not sub-dividable and is not easy to scale up or down in size. For example, existing battery module designs include a fixed amount of battery cells and voltages where changing either parameter would require major, structural changes. Further, current battery module designs may not adequately protect their battery cells from neighboring cell side ruptures or from exterior impacts. Moreover, existing battery modules may not protect battery cells well against convective, conductive, and/or radiation heat transfer in the case of thermal runaway.

Embodiments of the current disclosure disclose battery cassettes that address some of the above-described limitations. In some embodiments, the disclosed battery cassette includes a protective frame for mounting battery cells in a rigid assembly. The disclosed battery cassette may include a seal to protect battery cells from hot gases and a hard plastic frame to protect battery cells from exterior damage/impacts. In some embodiments, the disclosed battery cassette may include features that allow multiple battery cassettes to easily connect in integer numbers to create larger/smaller battery modules. The scope of the current disclosure, however, is defined by the attached claims, and not by the ability to solve any specific problem.

SUMMARY

Embodiments of the present disclosure relate to, among other things, battery systems for electric vehicles. Each of the embodiments disclosed herein may include one or more of the features described in connection with any of the other disclosed embodiments.

In one embodiment, a battery cassette is disclosed. The battery cassette may include: a frame including one or more hollow tubes; and a seal component having one or more hollow tubes aligned with the hollow tubes of the frame, wherein the frame and the seal component are configured to receive one or more battery cells in the aligned hollow tubes of the frame and the seal component.

In another embodiment, a battery cassette is disclosed. The battery cassette may include: a frame including one or more hollow tubes; a seal component having one or more hollow tubes aligned with the hollow tubes of the frame, the hollow tubes of the frame and the seal component configured to receive one or more battery cells, wherein the battery cassette circumferentially surrounds each battery cell along substantially an entire length of each battery cell.

In another embodiment, a battery cassette is disclosed. The battery cassette may include: a frame including one or more hollow tubes, the frame including a first material, wherein the hollow tubes are configured to receive one or more battery cells and the frame circumferentially surrounds each battery cell along substantially an entire length of each battery cell; a seal component having one or more hollow tubes aligned with the hollow tubes of the frame, the seal component including a second material different than the first material, wherein the hollow tubes of the seal component are configured to secure the one or more battery cells in the battery cassette; a tongue located at a first end of the battery cassette, wherein the tongue is configured to mate with a corresponding groove of a different battery cassette; and a groove located at a second end of the battery cassette, wherein the groove is configured to mate with a corresponding tongue of the different battery cassette.

In yet another embodiment, a battery cassette is disclosed. The battery cassette may include: a frame configured to support a plurality of similarly oriented cylindrical battery cells therein, wherein an external surface of the frame includes, (a) one or more first mating features configured to engage with corresponding mating features on the frame of a second battery cassette to removably couple the battery cassette to the second battery cassette, and (b) one or more second mating features configured to engage with corresponding mating features on an electrically conductive plate that is configured to electrically couple the battery cassette to the second battery cassette.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure. Each of the embodiments disclosed herein may include one or more of the features described in connection with any of the other disclosed embodiments.

FIGS. 3A-3F are different views of the battery cassette of FIG. 2A.

FIG. 4A is a cross-sectional view of a single tube of the battery cassette along line 4-4 in FIG. 3A.

FIG. 4B is an enlarged detailed view of a section of the battery cassette along line 4B of FIG. 4A.

DETAILED DESCRIPTION

The present disclosure describes the battery cassette for a battery system of an electric vehicle. While principles of the current disclosure are described with reference to a battery cassette of an electric vehicle, it should be understood that the disclosure is not limited thereto. Rather, the battery cassettes of the present disclosure may be used in any application (electric machine, electric tool, electric appliance, etc.). In this disclosure, relative terms, such as "about," "substantially," "slightly," or "approximately" are used to indicate a possible variation of ±10% in the stated value. Any implementation described herein as exemplary is not to be construed as preferred or advantageous over other implementations. Rather, the term "exemplary" is used in the sense of example or illustrative.

Figure 1A:
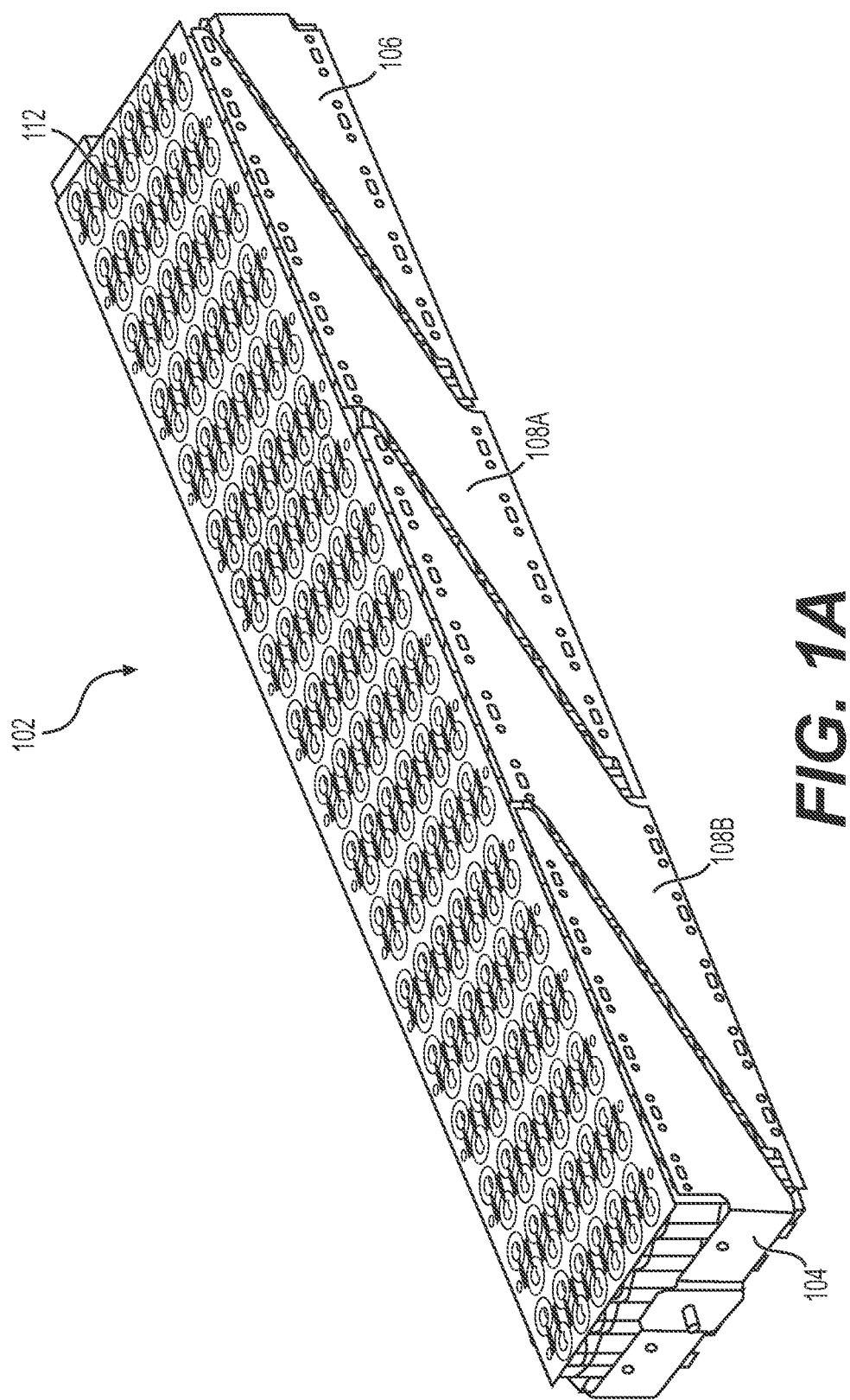
FIG. 1A is a perspective view of an exemplary battery block having battery cassettes according to some embodiments of the present disclosure.
Figure 1B:
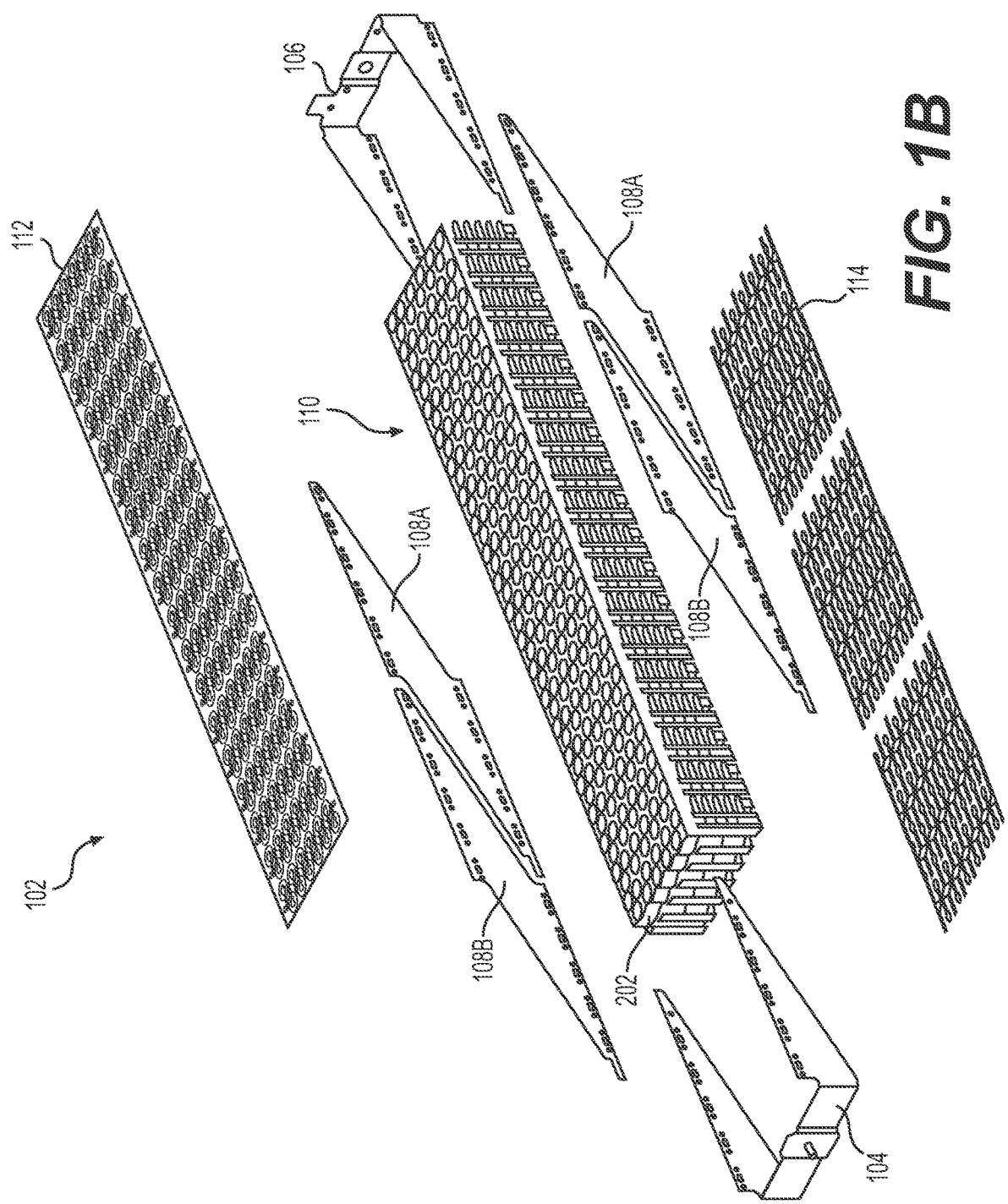
FIG. 1B is an exploded view of the battery block of FIG. 1A.

FIGS. 1A and 1B illustrate an exemplary battery block 102 having cassettes 202 ("cassette 202") according to one embodiment of the present disclosure. FIG. 1A shows a perspective view of battery block 102, and FIG. 1B shows an exploded view. In the discussion that follows, reference will be made to both FIGS. 1A and 1B. Battery block 102 may include multiple cassettes 202 (e.g., removably coupled) together. Each cassette 202 may include a plurality of battery cells mounted therein. Battery block 102 may form a part of a battery system used in, for example, an electric bus. Although an electric bus is referred to herein, battery block 102 (and cassette 202) may be included in any electric vehicle, energy storage device, or another application. In some embodiments, one or more battery blocks 102 may form a battery module of the battery system. Multiple battery modules (each including one or more battery blocks 102 with multiple cassettes 202 coupled together) may form a battery pack. The battery system (of the electric bus or other application) may include multiple battery packs electrically connected together to provide power. The multiple battery cells of battery block 102 may be electrically connected together in parallel and/or in series. In some embodiments, the battery cells of one or more cassettes 202 (of block 102) may be electrically connected together in parallel to form a parallel-connected set (or brick) of battery cassettes. Battery block 102 may include multiple such parallel-connected sets of battery cassettes. The multiple parallel-connected sets may be electrically connected together in series to form battery block 102. The battery cells may be rechargeable cylindrical battery cells having any chemistry (lithium-ion, nickel cadmium, etc.). As would be recognized by persons skilled in the art, packaging of cylindrical battery cells include unique challenges that are not present in packaging other configurations (e.g., prismatic, pouch-type, etc.) battery cells.

Battery block 102 includes a positive exterior conductive plate (ECP) 104, a negative ECP 106, one or more pairs of spanner ECPs 108A, 108B, a cassette array 110 including one or more cassettes 202 containing battery cells, one or more positive conductive foils 112, and one or more negative conductive foils 114. As can be seen in FIG. 1B, the positive and negative conductive plates 104, 106 may be a C-shaped component that includes an end surface that contacts an end surface of the cassette array 110 and side surfaces (e.g., wedge-shaped surfaces in FIG. 1B) that contact a portion of the side surfaces of the array 110. In some embodiments, the positive and negative conductive plates 104, 106 may be substantially similarly (or identically) shaped. The spanner ECPs 108A, 108B may also be identically shaped and may contact portions of the side surface of cassette array 110. In some embodiments, the positive and negative conductive foils 112, 114 may be used to electrically connect the battery cells of the one or more cassettes 202 that form a parallel-connected set in parallel. And, the electrically conductive plates may be used to connect the parallel-connected sets in series. It is understood that the positive ECP 104, negative ECP 106, and spanner ECPs 108A, 108B may include any shape, size, and/or number of components as desired.

As indicated in FIG. 1B, a pair of each spanner ECPs 108A, 108B may be positioned on opposite side surfaces of the battery block 102. In the context of the current disclosure and for ease of explanation, the positive exterior collective plate (ECP) 104, negative ECP 106, and the one or more pairs of spanner ECPs 108A, 108B will be collectively referred to as the "exterior collector plates" or ECPs. ECPs may, in general, be made of any electrically conductive material, such as, for example, aluminum. As will be described later with reference to FIGS. 5A-5B, cassettes 202 of block 102 may include features that engage with corresponding features (slots, etc.) of the ECPs to attach the ECPs to the block 102. Cassettes 202 may also include features that engage with corresponding features of positive and negative electrically conductive foils 112, 114 to attach these foils 112, 114 to the block 102. As will be described in more detail later, the ECPs connect groups of parallel-connected cassettes 202 of the cassette array 110 electrically in series.

Figure 2A:
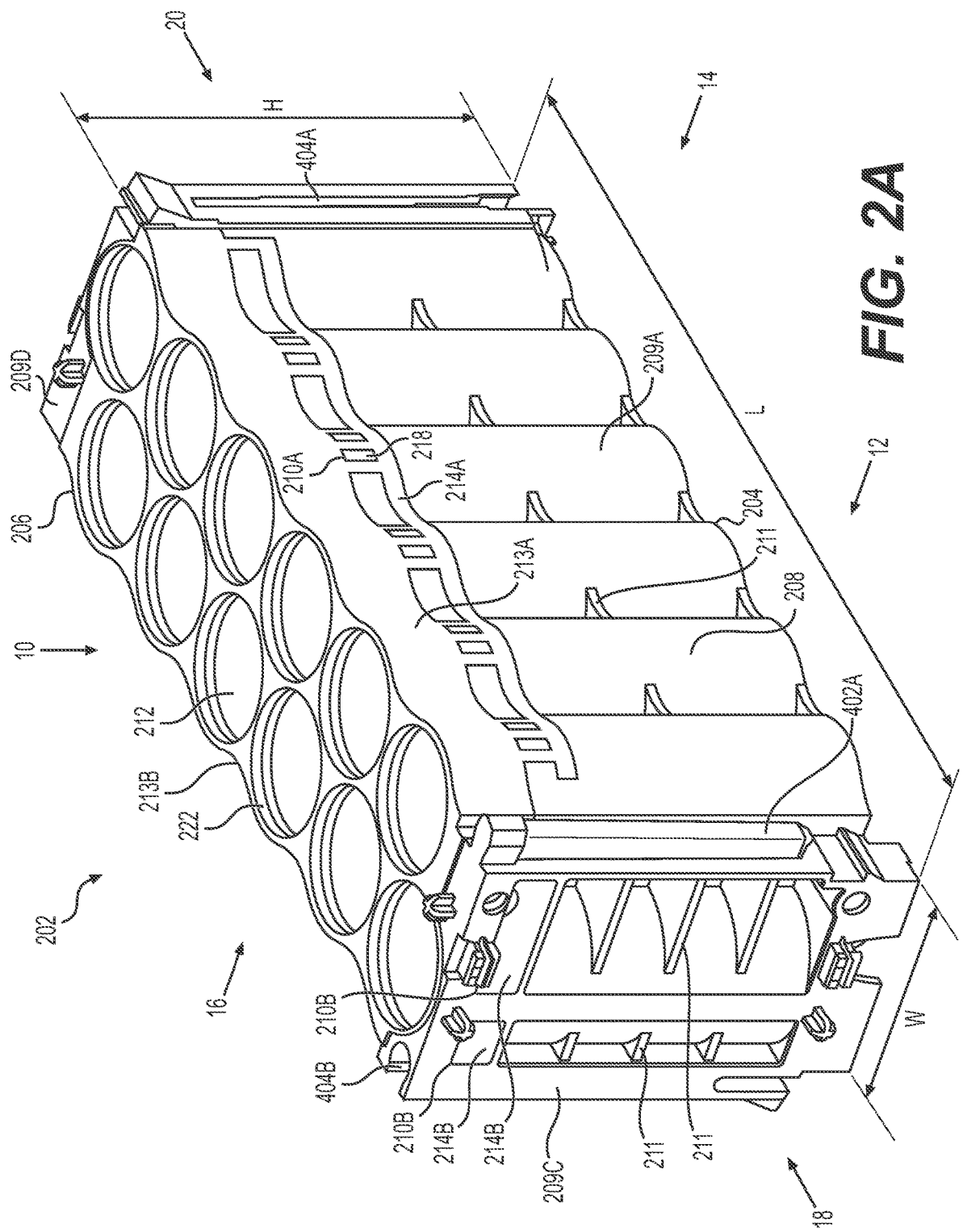
FIG. 2A is a perspective view of a single battery cassette isolated from the battery block of FIG. 1.
Figure 2B:
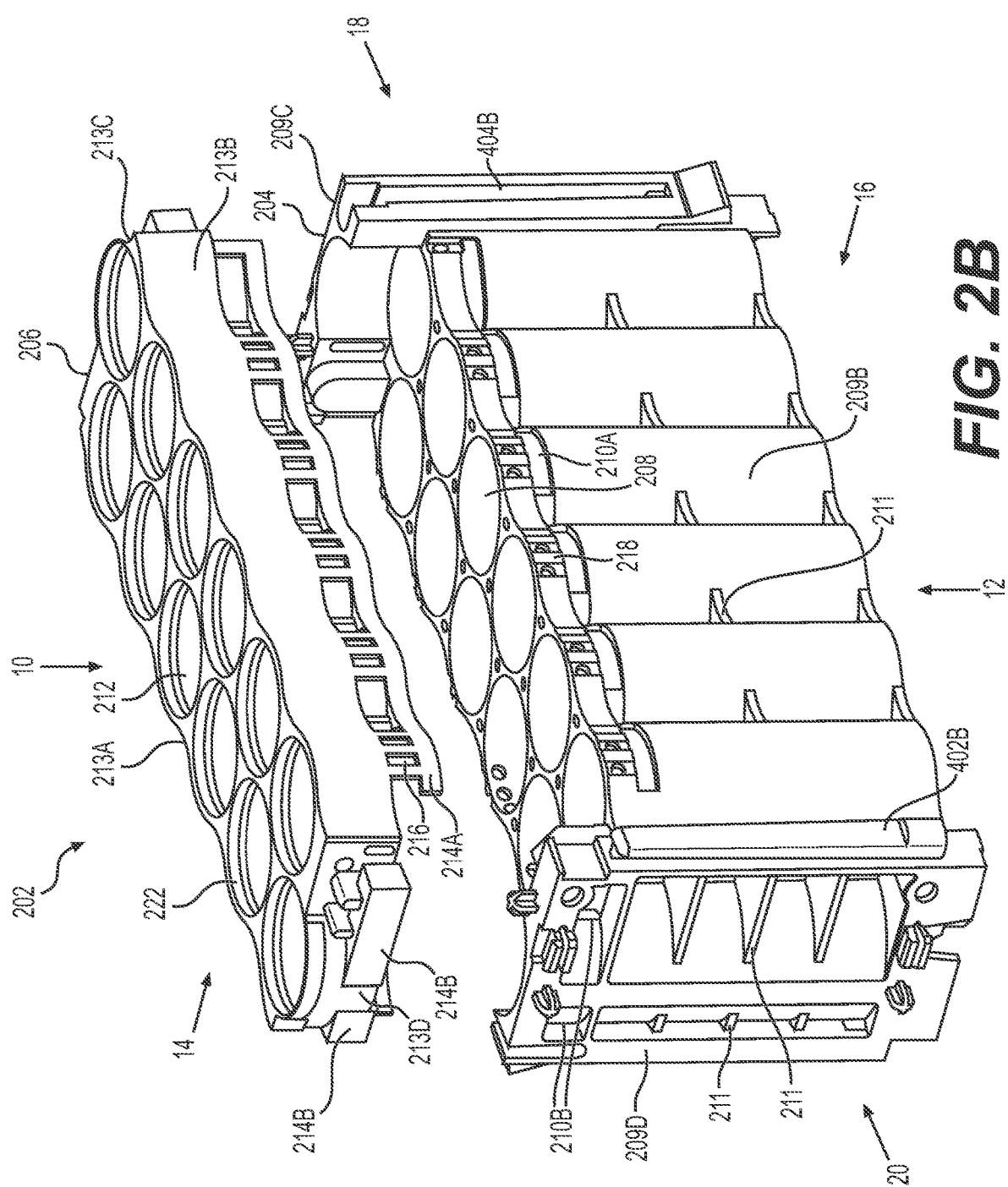
FIG. 2B is an exploded view of the battery cassette of FIG. 2A.

FIGS. 2A and 2B illustrate an exemplary cassette 202 isolated from the battery block 102. FIG. 2A shows a perspective view of the cassette 202, and FIG. 2B shows an exploded view. Although not a requirement, as evident from these figures, in some embodiments, cassette 202 may be shaped generally like a rectangular prism. Cassette 202 may include a top end 10 and a bottom end 12 opposite the top end 10. Bottom end 12 may be substantially parallel with top end 10. Cassette 202 may also include a first side 14, a second side 16 opposite first side 14, a third side 18, and a fourth side 20 opposite third side 18. First, second, third, and fourth sides 14, 16, 18, 20 may be substantially orthogonal (e.g., perpendicular) to both the top end 10 and bottom end 12 and may each extend between top end 10 and bottom end 12. First and second sides 14, 16 may be substantially parallel to other, but substantially orthogonal to third and fourth sides 18, 20. Similarly, third and fourth sides 18, 20 may be substantially parallel to each other, but substantially orthogonal to first and second sides 14, 16. Cassette 202 may include a length L, a width W, and a height H.

As shown in FIGS. 2A and 2B, cassette 202 may include a rigid frame 204 and a seal component 206. Frame 204 may include a generally rectangular (or rectangular prism) shape having one or more hollow tubes 208. It is noted that only one tube 208 is labelled in FIGS. 2A and 2B for clarity. The one or more tubes 208 may include a generally cylindrical shape and may generally correspond to the external shape of battery cells 300 that are positioned in tubes 208, as detailed below with reference to FIGS. 6A and 6B. An outer surface of the tubes 208 may form first and second side 14, 16 walls 209A, 209B of frame 204. Frame 204 may also include third and fourth side 18, 20 walls 209C, 209D. As shown in FIG. 2B, in some embodiments, the third and fourth side 18, 20 walls 209C, 209D may include a height H greater than a height of the tubes 208. For example, the third and fourth side 18, 20 walls 209C, 209D may extend beyond a top end 10 and/or a bottom end 12 of tubes 208. Accordingly, seal component 206 may be mounted on a top end 10 of tubes 208 such that a top end 10 of seal component 206 is flush with a top end 10 of third and fourth side 18, 20 walls 209C, 209D. Frame 204 may also include one or more ribs 211 for providing additional structural support. For example, ribs 211 may enable a reduction in material and weight of frame 204 (and thus, cassette 202), while maintaining structural integrity of frame 204. Any number of ribs 211 may be included on frame 204 and the ribs 211 may be located at any position on frame 204.

In some embodiments, frame 204 may include one or more plastic materials. The material of frame 204 may include, for example, thermoset plastics, thermoplastics, crystalline plastics, glass filled plastics, amorphous plastics, non-lubricated plastics, and/or any combination thereof. In one embodiment, the material of frame 204 may include glass-filled (GF), flame retardant (FR), non-conductive plastic. For example, frame 204 may include a crystalline plastic including glass fibers and metal hydroxides. Accordingly, the material of frame 204 may maintain its form when exposed to high temperatures (e.g., when a battery cell 300 positioned in frame 204 experiences a thermal event or rupture). In some embodiments, the frame 204 may be made of one or more amorphous or semi-crystalline thermoplastic materials (e.g., polyamide, polyphenylene oxide, polybutylene terephthalate, etc.). In some embodiments, the frame 204 may be made of a blend of multiple thermoplastic materials. The material makeup of frame 204 preferably includes low density, medium-high stiffness, high temperature, dimensionally accurate/stable, and/or medium-high surface energy materials. It is understood that frame 204 may include any material as desired, such as, but not limited to, metals, composites, fibers, ceramics, or any other material. In some embodiments, frame 204 may be opaque (e.g., black) to minimize or prevent radiant (e.g., infrared) heat transfer. For example, frame 204 may include a colored resin, such as a black resin, to help reduce radiation heat transfer between the battery cells and neighboring cells. However, it is understood that frame 204 may also be substantially clear (e.g., transparent) and/or may include any gradient of opaqueness and/or any color. As will be described below, frame 204 may include features, such as one or more apertures 210A, 210B, that engage with corresponding features (e.g., flanges 214A, 214B) of seal component 206 to attach the seal component 206 to frame 204.

Seal component 206 may include a shape generally corresponding to the shape of frame 204. For example, seal component 206 may include a generally rectangular shape. Seal component 206 may include one or more hollow tubes 212 that may include a shape generally corresponding to the shape of tubes 208 of frame 204. It is noted that only one tube 212 is labelled in FIGS. 2A and 2B for clarity. Tubes 212 may include, for example, a generally cylindrical shape for receiving battery cells 300, as detailed below. An outer surface of the tubes 212 may form first and second side 14, 16 walls 213A, 213B of seal component 206. Seal component 206 may also include third and fourth side 18, 20 walls 213C, 213D. Seal component 206 may be mounted on the top end 10 of tubes 208 such that the top end 10 of seal component 206 is flush with a top end 10 of third and fourth side 18, 20 walls 209C, 209D. Further, when seal component 206 is mounted on frame 204, first and second side 18, 20 walls 213A, 213B of seal component 206 may be flush with first and second side 18, 20 walls 209A, 209B of frame 204.

Seal component 206 may also include one or more features, such as flanges 214A, 214B that engage with the one or more apertures 210A, 210B of frame 204. The flanges 214A and apertures 210A may be located on the first and second sides 14, 16 of cassette 202 (e.g., first and second side 14, 16 walls 213A, 213B of seal component 206). Flanges 214B and apertures 210B may be located on the third and fourth sides 18, 20 of cassette 202 (e.g., third and fourth side 18, 20 walls 213C, 213D of seal component 206). Further, flanges 214A may include one or more cutouts 216 for engaging with one or more protrusions 218 of frame 204. The protrusions 218 may extend from frame 204 at a location adjacent to the one or more apertures 210A. Accordingly, flanges 214A and cutouts 216 may engage with apertures 210A and protrusions 218, and flanges 214B may engage with apertures 210B to mount seal component 206 to frame 204.

Seal component 206 may include any compliant material. In one embodiment, the material of seal component 206 may be different than the material of frame 204. However, it is understood that the material of seal component 206 may be the same as the material of frame 204. In some embodiments, seal component 206 may include one or more materials, such as elastomers, that can maintain structural integrity in high temperatures and include a low density. In some embodiments, the material of seal component 206 may include, for example, rubbers, thermoplastic elastomers, thermoplastic copolyesters, or any other elastomer material, and/or combinations thereof. In some embodiments, seal component 206 may include liquid silicone rubber, thermoplastic copolyesters (TPE-C), and/or another high temperature elastomer. Such materials may help to prevent, or reduce, convective heat transfer between the battery cells and seal component 206. Seal component 206 may further include flame retardant materials, such as metal hydroxides or the like. The material used for seal component 206 may have any density (and other material properties). In some embodiments, the density of the material of seal component 206 may be in the range of 0.8 g/cm$^3$ to 2.00 g/cm$^3$, for example, 1.21 g/cm$^3$. However, as explained above, in general, the material of seal component 206 may have any density as desired. The material of seal component 206 may include materials that include high temperature resistance, amorphous, thermoset, low density materials. For example, the material of seal component 206 may maintain structural integrity when exposed to temperatures of at least 200 degrees Celsius or greater. In some embodiments, seal component 206 may be opaque for prevention of radiation (e.g., infrared) heat transfer. For example, seal component 206 may include a colored resin, such as a black resin, to help reduce radiation heat transfer between the battery cells and seal component 206. However, it is understood that seal component 206 may also be substantially clear (e.g., transparent) and/or may include any gradient of opaqueness and/or any color.

Cassette 202 may be manufactured or formed through molding, casting, machining, joining, or any other manufacturing process (e.g., 3D printing). Frame 204 may be manufactured by, for example, injection molding, or the like. Further, seal component 206 may be manufactured by injection molding, compression molding, or the like. In some embodiments, frame 204 and seal component 206 may be formed by overmolding. As used herein, overmolding is a process in which a single part (e.g., cassette 202) is created using two or more different materials in combination. Overmolding may include a first material, such as the material of frame 204, being partially or fully covered by a second material, such as the material of seal component 206 during the manufacturing process. Accordingly, overmolding may enable seal component 206 to bond to frame 204. Additionally, or alternatively, an adhesive bond, such as epoxy or the like, may be used to bond seal component 206 to frame 204. Thus, cassette 202 may include a two-piece construction (e.g., frame 204 and seal component 206) for securing battery cells 300, as detailed further below. In some embodiments, frame 204 and seal component 206 may be manufactured together as a single component such that cassette 202 includes a single component.

The side walls 209A, 209B, 209C, 209D of frame 204 and the side walls 213A, 213B, 213C, 213D of seal component 206 may define the length L, height H, and width W of cassette 202. For example, a length of side walls 209A, 209B including a length of side walls 209C, 209D may define the overall length L of cassette 202. The length L is defined by the number of tubes 208, 212 included on cassette 202. Further, a height and width of side walls 209C, 209D may define the overall height H and width W of cassette 202, respectively. The dimensions (L×H×W) of cassette 202 may correspond to an overall size of the battery modules and may be chosen accordingly. In one embodiment, the length L may be 145.65 mm (5.73 in), the height H may be 73.25 mm (2.88 in), including protrusions 502B, or 69.75 mm (2.746 in) when protrusions 502B are not included, and the width W may be 40.7 mm (1.602 in). However, the dimensions of cassette 202 may include a range of dimensions. For example, the length L may be in a range from 21.5 mm (0.846 in) to 1000 mm (39.370 in). The height H may be in a range from 11 mm (0.433 in) to a total height of battery cells 300, for example, 69.75 mm (2.746 in). The width W may be in a range from 21.5 mm (0.846 in) (e.g., when only a single row 220A of tubes 208, 212 is included) to 1000 mm (39.370 in). Further, an overall weight of cassette 202 may be 0.097 kg (0.214 lbs). However, the weight of cassette 202 may be in a range from 0.04 kg (0.0881 lbs) to 0.3 kg (0.661 lbs). It is understood that cassette 202 may include any size, dimensions, and/or weight, as desired.

Figure 3A:
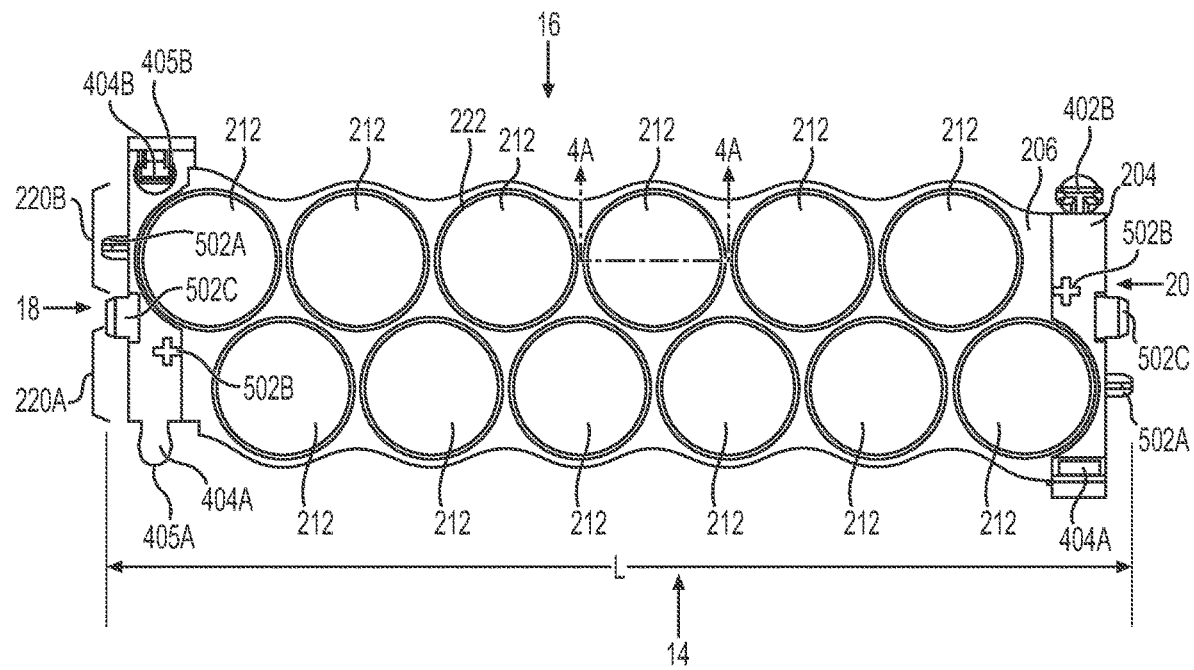
Figure 3B:
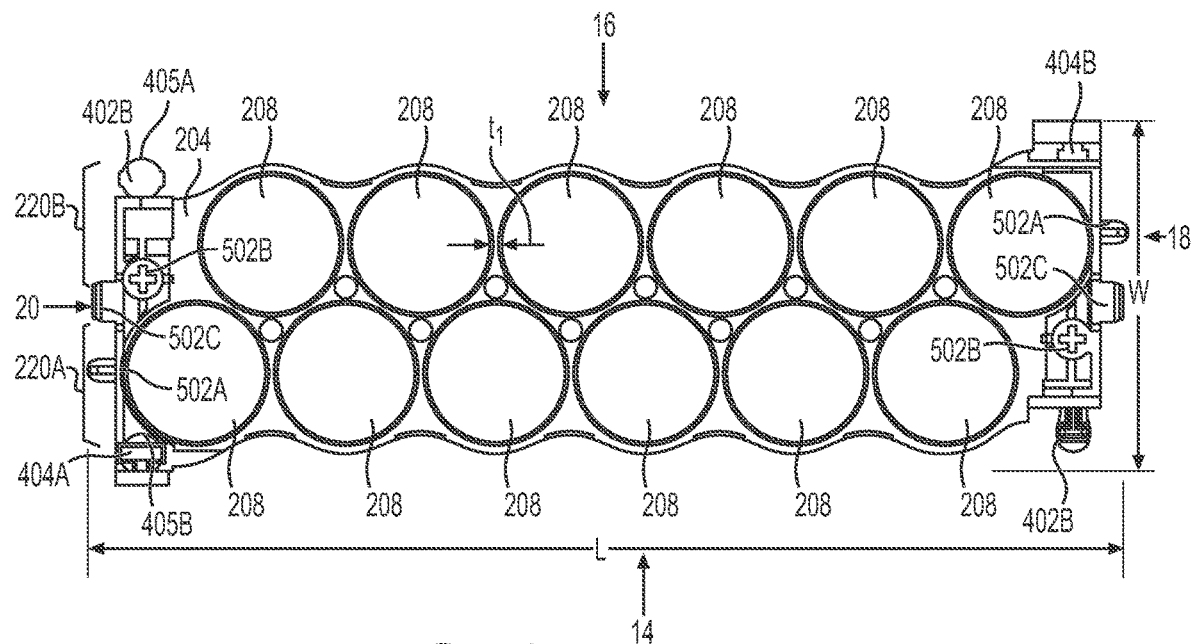

FIG. 3A is a top end 10 view of an exemplary embodiment of cassette 202 of FIG. 2A. FIG. 3B is a bottom end 12 view of the exemplary cassette 202 of FIG. 2A. As shown in FIGS. 3A and 3B, in some embodiments, cassette 202 may include twelve hollow tubes 208, 212. For example, frame 204 may include twelve tubes 208 and seal component 206 may include twelve tubes 212, accordingly. The tubes 208, 212 may be aligned in one or more rows. For example, cassette 202 may include a first row 220A and a second row 220B of tubes 208, 212. Each row 220A, 220B may include six tubes 208, 212. The rows 220A, 220B may be offset such that the tubes 208, 212 of the adjacent rows 220A, 220B are not aligned perpendicularly. Accordingly, the tubes 208, 212 may be tightly nested to enable a greater number of tubes 208, 212 while minimizing an overall size of cassette 202. It is understood that cassette 202 may include any number of tubes 208, 212 and any number of rows 220A, 220B as desired. Further, frame 204 may include a thickness t1 between tubes 208. The thickness t1 between tubes 208 of frame 204 may be defined by a distance between tubes 208. In one embodiment, the thickness t1 may be less than 1 mm (0.0394 in), and preferably may be 0.80 mm (0.0315 in). As detailed below, an inner diameter of tubes 208 may taper from the top end 10 to the bottom end 12. Accordingly, the thickness t1 between tubes 208 may vary from the top end 10 to the bottom end 12. Thus, the thickness t1 may be in a range from 0.25 mm (0.00984 in) at the top end 10 to 0.8 mm (0.0315 in) at the bottom end 12.

FIG. 4A is a cross-sectional view of a single tube 208, 212 along line 4-4 of the cassette 202 of FIG. 3A. FIG. 4B is a detailed view of the circled portion of the single tube 208, 212 of FIG. 4A. As shown in FIGS. 4A and 4B, tube 208 of frame 212 may include a varying inner diameter. For example, tube 208 may include a first diameter d1 and a second diameter d2. In some embodiments, diameter d1 may be greater than the diameter d2. In some embodiments, the inner diameter of tube 208 of frame 204 may taper from the top end 10 (e.g., from diameter d2) to the bottom end 12 (e.g., diameter d1) along a length of tube 208 such that the inner diameter of tube 208 varies from the top end 10 towards the bottom end 12. Diameter d2 may be slightly larger than, slightly smaller than, or substantially equal to, a diameter d5 of battery cells 300, as detailed further below. In one embodiment, diameter d1 may be 21.46 mm (0.845 in) and diameter d2 may be 21 mm (0.827 in). It is understood that diameter d1 and diameter d2 may be any size and/or dimension as desired.

Tube 212 of seal component 202 may include a third inner diameter d3. Diameter d3 may be the same, or substantially similar, to diameter d2 of tube 208. For example, diameter d3 may be 21 mm (0.827 in). In some embodiments, the inner diameter of tube 212 may be substantially constant along a length of tube 212. However, in some embodiments, the inner diameter of tube 212 may taper along the length of tube 212. As best seen in FIG. 4B, tube 212 of seal component 206 may include a circumferential lip or protrusion 222 that protrudes from a sidewall of the tube 212 into the tube cavity. The protrusion 222 may extend around an inner circumference of tube 212 such that the protrusion 222 is internal of seal component 206. Protrusion 222 may extend radially in from a radially inner wall of tube 212 such that tube 212 may include a fourth inner diameter d4. Diameter d4 may be less than diameter d3 and/or diameter d2. In one embodiment, diameter d4 may be 20.1 mm (0.791 in). The protrusion 222 may correspond to a groove 302 (shown in FIG. 7A) on the cylindrical sidewall of battery cell 300 such that the groove 302 of battery cell 300 receives protrusion 222 when battery cell 300 is mounted in tubes 208, 212, as detailed further below. In some embodiments, tubes 212 of seal component 206 may include a circumferential lip or protrusion (not shown) at the top end 10 (e.g., located longitudinally above protrusion 222) to thermally and electrically insulate a shoulder of battery cell 300, while also providing a location stop during battery cell 300 installation. For example, the circumferential lip of each tube 212 may be at, or adjacent, a top end 10 surface of seal component 206 and may extend radially in from the radially inner wall of tube 212. Accordingly, the circumferential lip may radially cover a portion of battery cell 300. The circumferential lip at the top end 10 may enable use of unwrapped cylindrical battery cells 300 by provided additional thermal and electrical insulation.

Figure 5A:
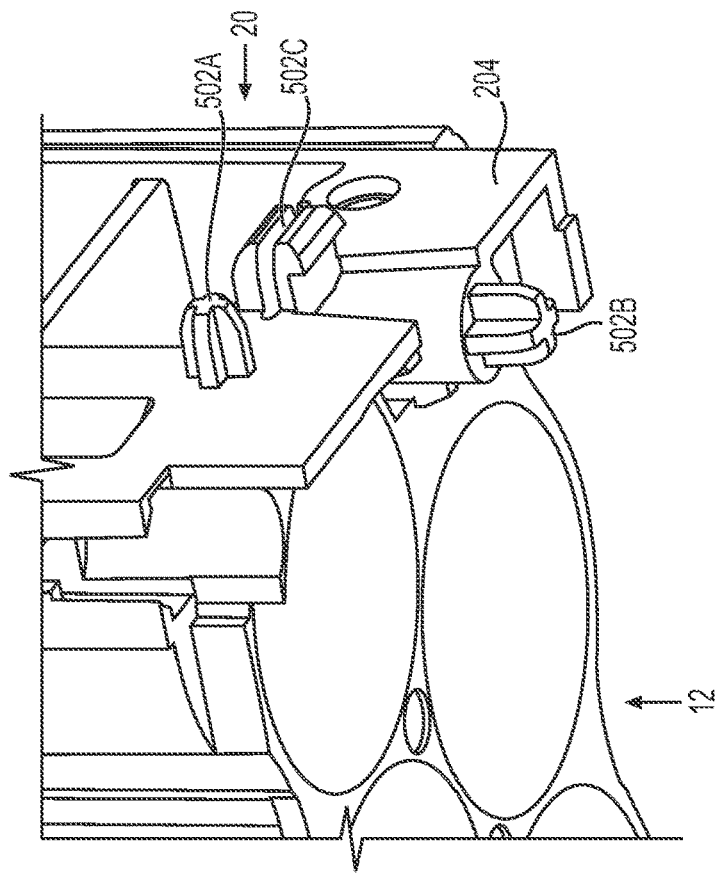
FIGS. 5A-5B are different enlarged views of the battery cassette of FIG. 2A.
Figure 6A:
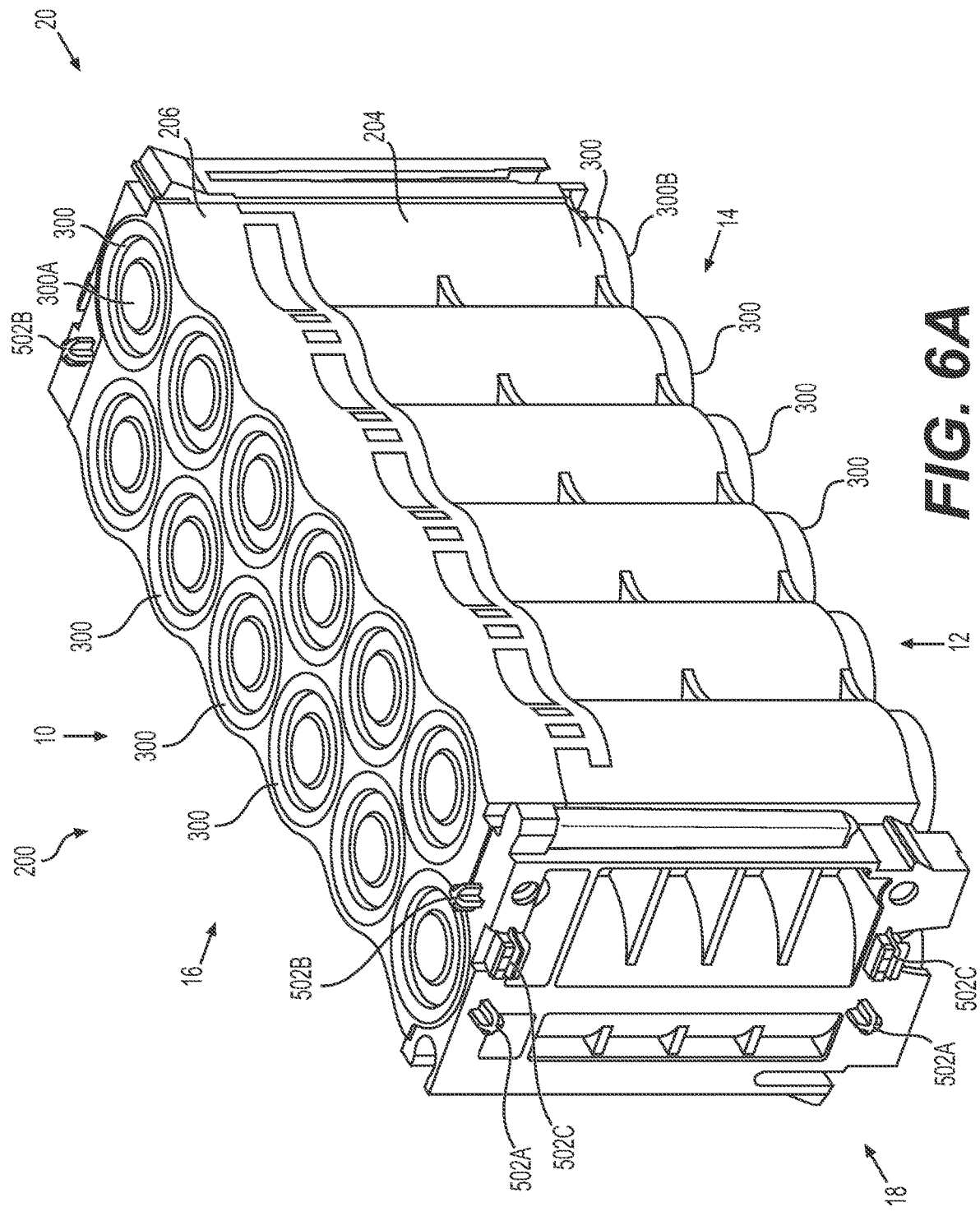
FIG. 6A is a perspective view of the battery cassette of FIG. 2A with battery cells mounted therein.
Figure 6B:
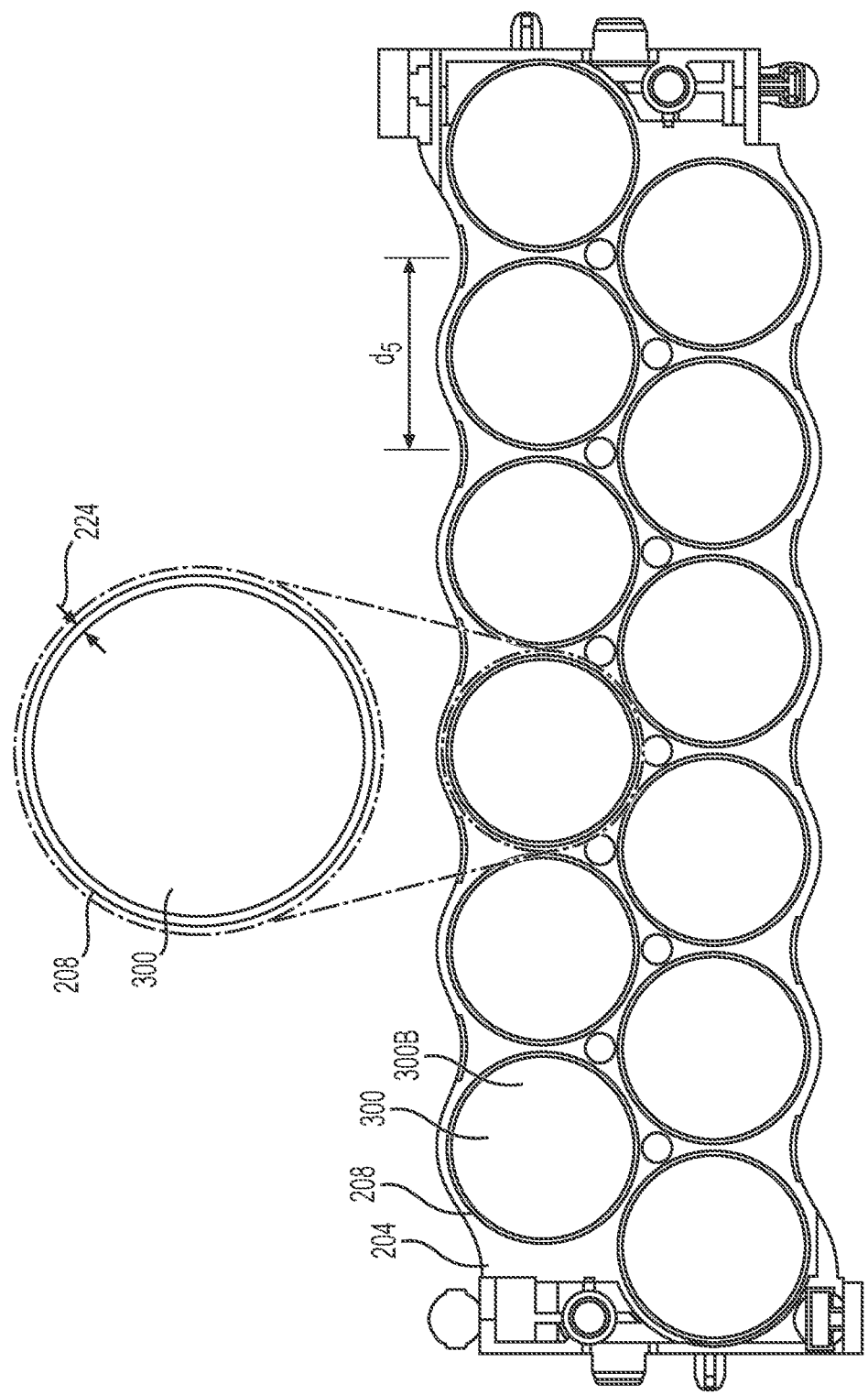
FIG. 6B is a bottom side view of the battery cassette of FIG. 6A.

FIG. 6A shows a perspective view of cassette 202 with battery cells 300 mounted therein. FIG. 6B shows a bottom end 12 view of the cassette 202 with a detailed view of the battery cells 300 mounted therein. As shown in FIG. 6B, battery cells 300 may include an outer diameter d5. Diameter d5 may be smaller than diameter d1 and diameter d2 and may be larger than diameter d3 and diameter d4. Accordingly, battery cells 300 can be inserted into cassette 202, as detailed below with respect to FIG. 5A. In one embodiment, diameter d5 may be, for example, 21.1 mm (0.831 in). It is understood that any type of battery cell 300 may be used that includes any size, shape, and/or voltage as desired. In some embodiments, the maximum diameter of the battery cell 300 may be slightly larger than the inner diameter of the plastic tube at the top end (d3), e.g., if the tolerances of the parts stack worst case. However, typically, the maximum diameter of the battery cell 300 is slightly smaller than the inner diameter of the plastic tube at the top end.

Each battery cell 300 includes a current interrupt device (CID) positioned inside its casing proximate its positive terminal. The CID is typically employed to provide protection against any excessive internal pressure increase in the battery cell by interrupting the current path from the battery cell when pressure inside its casing is greater than a predetermined value. The CID typically includes first and second conductive plates in electrical communication with each other. The first and second conductive plates are, in turn, in electrical communication with an electrode and a terminal of the battery cell, respectively. The second conductive plate separates from (e.g., deforms away or is detached from) the first conductive plate of the CID when pressure inside the battery is greater than a predetermined value, whereby a current flow between the electrode and the terminal is interrupted. The gap between the first and second conductive plates also allows the high pressure gases from inside the casing of the battery cell to vent or escape to the outside. In some cases, the first and second conductive plates of the CID are formed of different materials that expand differently when heated to cause the two plates to separate from each other. For example, when the temperature of the battery cell exceeds a threshold (for example, due to a defect in the battery cell), the bi-metallic conductive plates of the CID deflects or bends (e.g., due to different thermal expansions of the materials of the bi-metallic disc) and cuts the battery cell off from the circuit.

When mounted in cassette 202, battery cells 300 may be flush with the top end 10 of seal component 206 at a positive terminal 300A end of battery cell 300. Frame 204 may circumferentially surround each battery cell 300. Further, battery cell 300 may extend beyond the bottom end 12 of frame 204 at a negative terminal 300B end of battery cell 300. As such, cassette 202 may circumferentially surround each battery cell 300 along substantially an entire length of each battery cell 300. The groove 302 (FIG. 7A) of battery cells 300 may receive protrusion 222 of seal component 206 such that seal component 206 may secure battery cells 300 in cassette 202. Further, battery cells 300 may be secured in cassette 202 by an interference fit with tubes 212 of seal component 202 due to outer diameter d5 of battery cells 300 being smaller than inner diameter d3 of tube 212. The seal component 206 also allows the cells 300 to vent via their CID proximate the positive charge end 300A.

As further shown in FIG. 6B, a circumferential gap 224 may be formed between battery cell 300 and tube 208 of frame 204 when battery cells 300 are mounted in cassette 202. The circumferential gap 224 may be formed due to outer diameter d5 of battery cells 300 being smaller than inner diameter d1 of tubes 208. Accordingly, due to the difference between outer diameter d5 and inner diameter d1, battery cells 300 may be inserted into cassette 202 from the bottom end 12 of cassette 202. The circumferential gap 224 may also allow a column of air between frame 204 and cells 300 to help prevent conductive heat transfer between the cells 300 and frame 204.

Figure 3C:
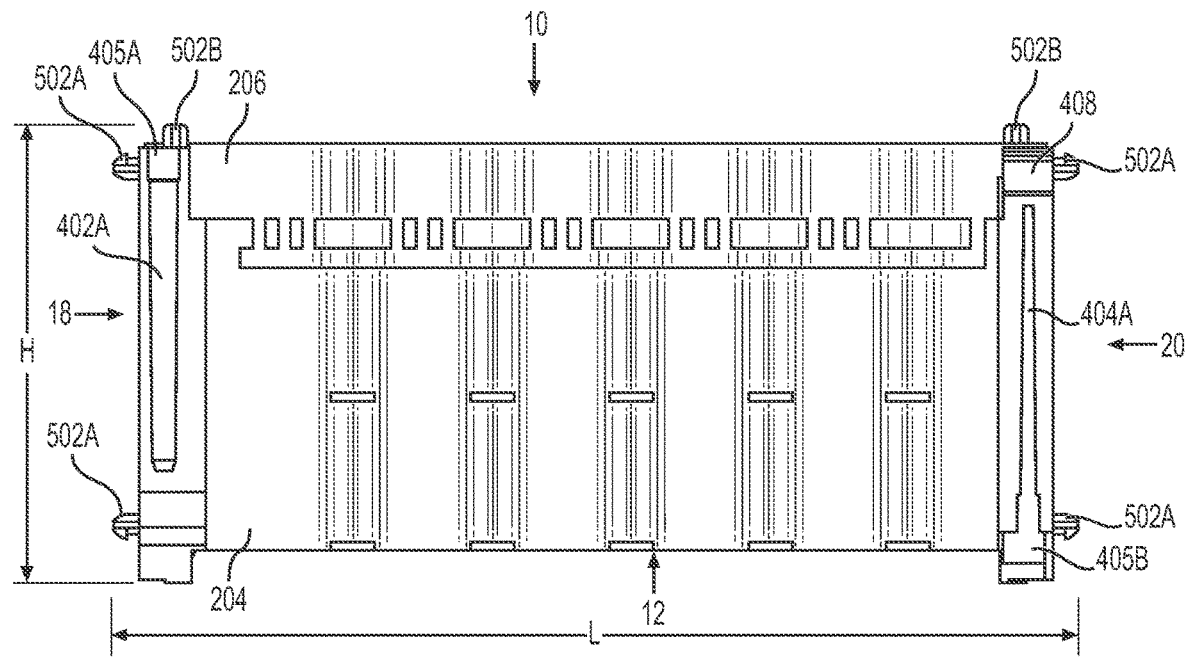
Figure 3D:
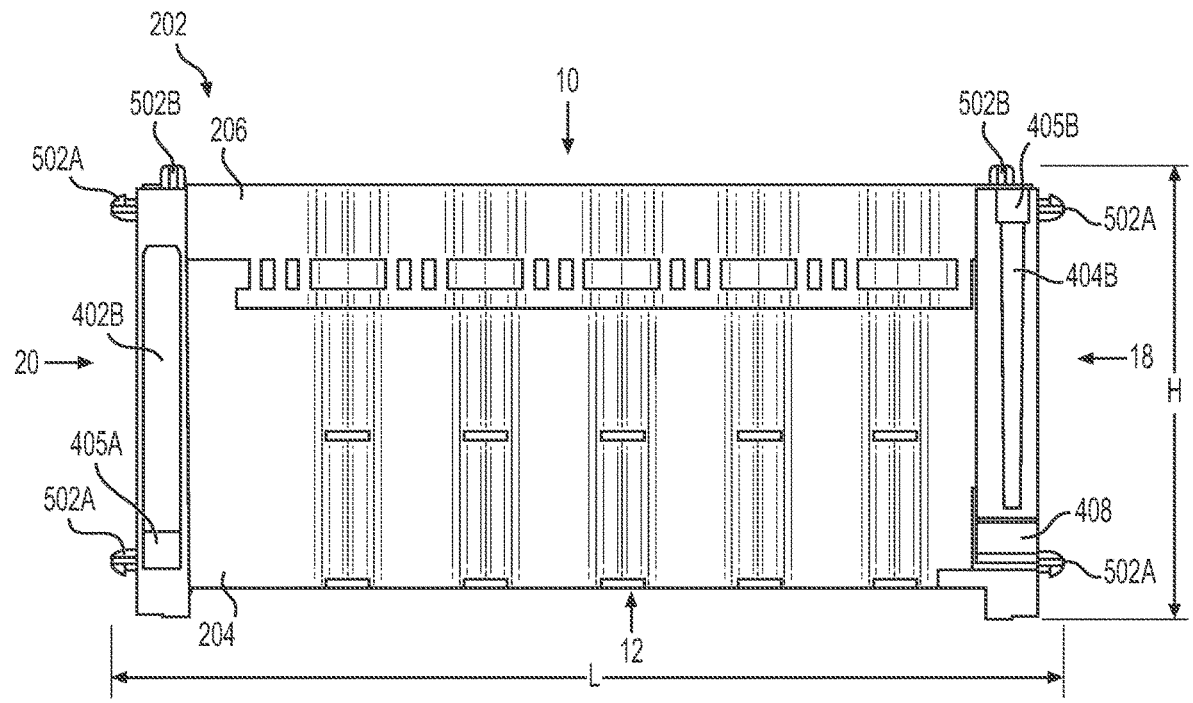

FIG. 3C is a first side 14 view of cassette 202, FIG. 3D is a second side 16 view of cassette 202, FIG. 3E is a third side 18 view of cassette 202, and FIG. 3F is a fourth side 20 view of cassette 202. As shown in FIGS. 3C-3F, cassette 202 may include one or more mating features, such as a tongue 402A, 402B and groove 404A, 404B configuration, for mating multiple cassettes 202 together, as detailed further below with respect to FIGS. 7A-7C. For example, first side 14 of cassette 202 may include a first tongue 402A and a first groove 404A located on frame 204. Tongue 402A may be located at a first end (e.g., at third side 18) of frame 204 and groove 404A may be located at a second opposite end (e.g., at fourth side 20) of frame 204 on the first side 14. Second side 16 of cassette 202 may include a second tongue 402B and a second groove 404B located on frame 204. Tongue 402B may be located at the second end (e.g., at fourth side 20) of frame 204 and groove 404B may be located at the first end (e.g., at third side 18) of frame 204 on the second side 16.

As shown in FIGS. 3C and 3D, tongues 402A, 402B and grooves 404A, 404B may extend substantially an entire height H of cassette 202 (e.g., frame 204 of cassette 202). Tongue 402A may include a shape corresponding to a shape of groove 404B such that tongue 402A may be fitted (e.g., slid) into groove 404B of another cassette 202. Likewise, tongue 402B may include a shape corresponding to a shape of groove 404A such that tongue 402B may be fitted (e.g., slid) into groove 404A of another cassette 202.

Tongues 402A, 402B and grooves 404A, 404B may be oriented such that tongues 402A, 402B may slide (e.g., mate) into grooves 404A, 404B. For example, tongue 402A may be oriented in a first direction and groove 404B may be oriented in the first direction such that the bottom end 12 of tongue 402A may slide into the top end 10 of groove 404B. Likewise, tongue 402B may be oriented in a second direction and groove 404A may be oriented in the second direction such that the top end 10 of tongue 402B may slide into the bottom end 12 of groove 404A. Accordingly, tongue 402A and groove 404A of cassette 202 may slide onto and mate with tongue 402B and groove 404B of an adjacent cassette 202 to removably couple the two cassettes together.

As shown in FIGS. 3A-3D, cassette 202 may also include mating and datum features 405 at an end of the tongue 402A, 402B and groove 404A, 404B features to control tolerance stack of the block 102. For example, the datum features 405A, 405B may include 2-way datum and/or a 4-way datum. As used herein, a 2-way datum is a datum feature 405 that restricts movement along one (1) axis (i.e., in two directions along one axis). Further, a 4-way datum is a datum feature 405 that restricts movement along two (2) axes. The datum features 405 may include, for example, a pin 405A and a corresponding hole 405B for receiving the pin 405A. The hole 405B may include a shape corresponding to a shape of the pin 405A. For example, the pin 405A may include a generally cylindrical shape and the hole 405B may include a generally circular shape. The pins 405A may be located on tongues 402A, 402B, respectively, and the holes 405B may be located in grooves 404A, 404B, respectively.

As further shown in FIGS. 3C-3F, cassette 202 may also include one or more snap-fit features for locking cassettes 202 together after two cassettes 202 have been mated. The snap-fit features may include a male snap components 406A and female snap components 406B. Male snap components 406A may include one or more protrusions that correspond to a snap-in area of the female snap components 406B. Accordingly, the female snap components 406B may receive the male snap components 406A and lock, or restrict, the male snap components 406A in place. The snap features may also include a lever 408, or pin, for undoing the snap-fit of the male and female snap components 406A, 406B. For example, the lever 408 may be pushed such that the male component 406A is no longer restricted by the female component 406B. When the lever 408 is pushed, the male component 406A may be moved beyond the female component 406B to undo the snap-fit. While the exemplary embodiments of the mating features described herein include tongue and groove and snap-fit features, it is understood that the mating features may include any type of mating feature for mating two or more components together. For example, the mating features may include one or more fasteners (e.g., bolts, screws, etc.), adhesive, or the like. Further, the mating features may be located on any side 10, 12, 14, 16, 28, 20 of cassette 202 and in any location, and may include any number and/or combination of mating features.

Figure 5B:
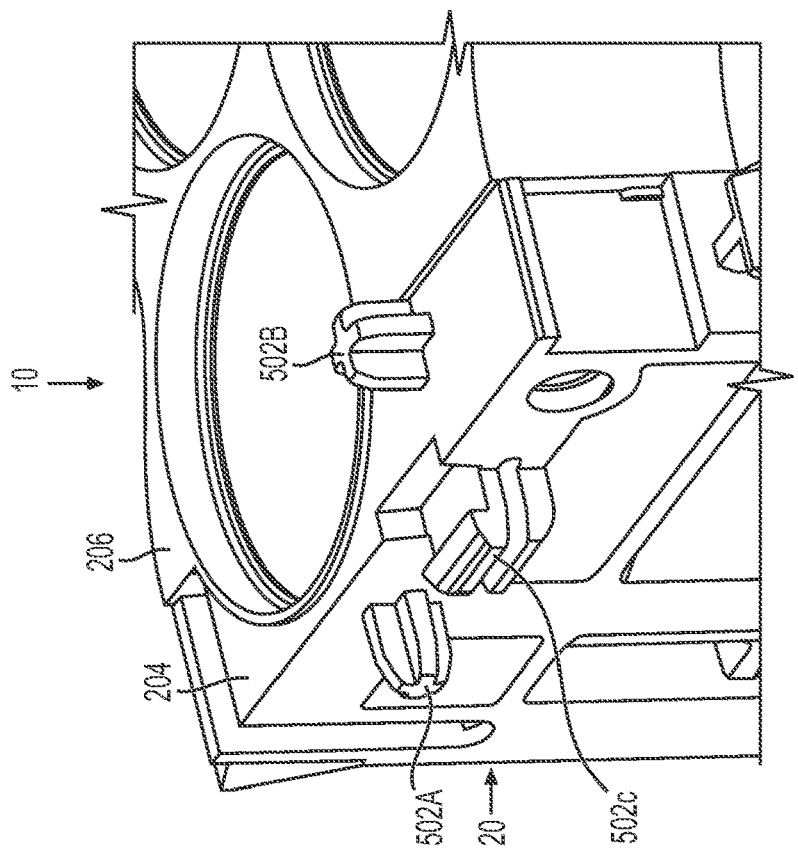

FIG. 5A shows an enlarged perspective view of a portion of the top end 10 of cassette 202. FIG. 5B shows an enlarged perspective view of a portion of the bottom end 12 of cassette 202. With reference to FIGS. 2A-2B, 3A-3F, and 5A-5B, cassette 202 may further include features to attach to the positive and negative conductive foils and/or the ECPs to form block 102. In some embodiments, the features may include keying, alignment and locking features 502A, 502B, 502C, etc. on the frame 204 of cassette 202 that engage with corresponding features (slots, etc.) on ECPs and/or the foils to couple the ECPs and/or the foils to the cassette array. For example, features 502A and 502B may include protrusions, or pins, on cassette 202 (e.g., on frame 204 of cassette 202) that may engage with (or fit into) slots or cavities in the ECPs and/or the foils to couple the ECPs and/or the foils to the cassette array. These protrusions and slots may be configured or shaped such that the ECPs and/or the foils are oriented in the desired manner on cassette array. Further, features 502C may include a snap-fit feature that includes a male component for engaging with a corresponding slot of the ECPs and/or foils. Accordingly, the ECPs and/or foils may be secured to the cassette array 110.

In one embodiment, protrusions 502A and snap feature 502C may be located on the third side 18 and fourth side 20 of frame 204. For example, each side 18, 20 may include two (2) protrusions 502A and two (2) snaps 502C. A first protrusion 502A and a first snap 502C may be located at a top end 10 of each side 18, 20 and a second protrusion 502A and a second snap 502C may be located at a bottom end 12 of each side 18, 20. Further, protrusions 502B may be located on a top end 10 and a bottom end 12 of frame 204. For example, a first protrusion 502B and a second protrusion 502B may be located on top and bottom ends 10, 12, respectively, at third side 18. Likewise, a third protrusion 502B and fourth protrusion 502B may be located on top and bottom ends 10, 12, respectively, at fourth side 20. It is understood that cassette 202 may include any number and arrangement of features 502A-502C and features 502A-502C may be located at any location on frame 204 and/or seal component 206.

Figure 7A:
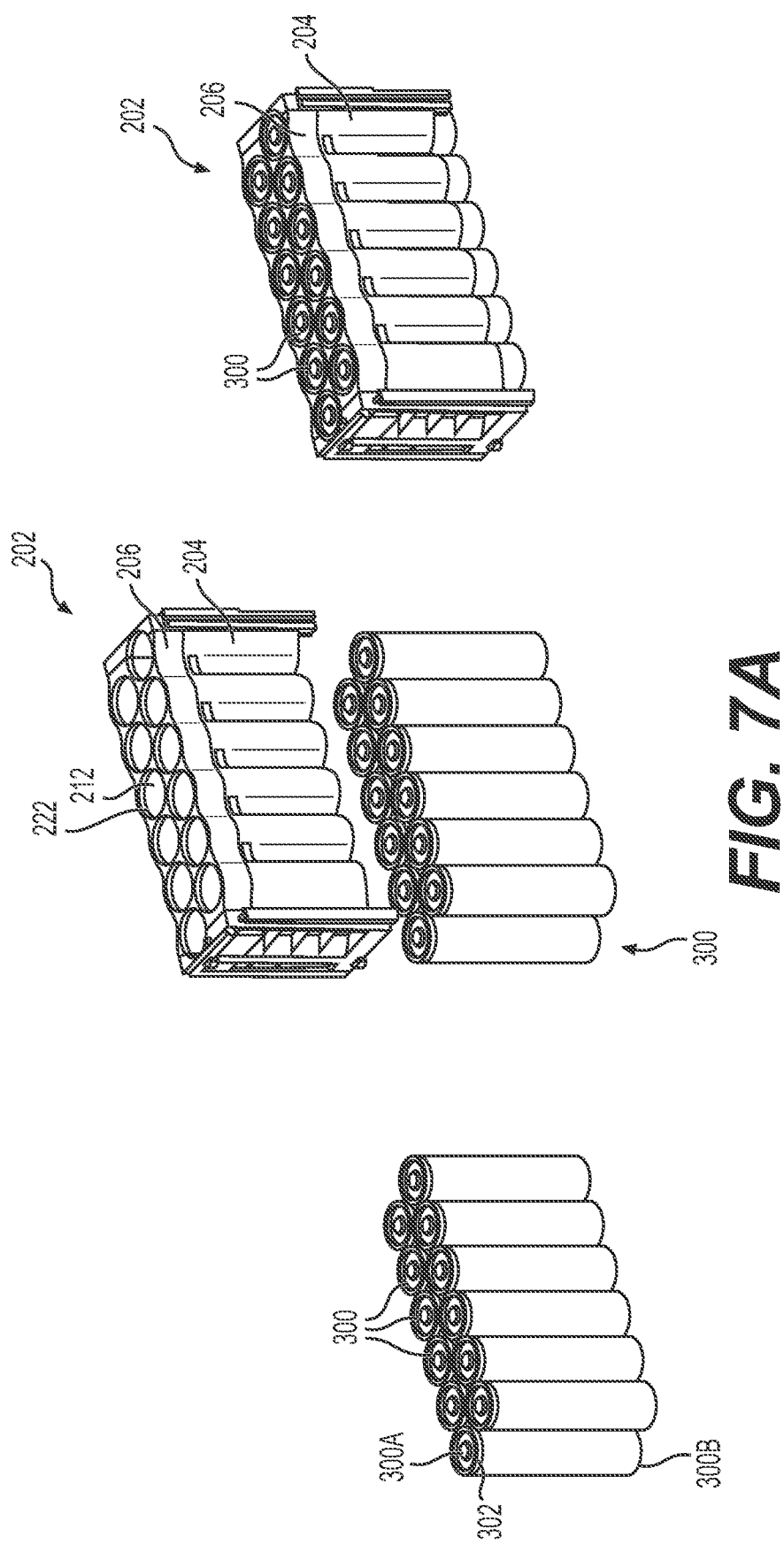
FIGS. 7A-7C pictorially illustrate the method of assembling a battery block by building up an array of battery cassettes.
Figure 7B:
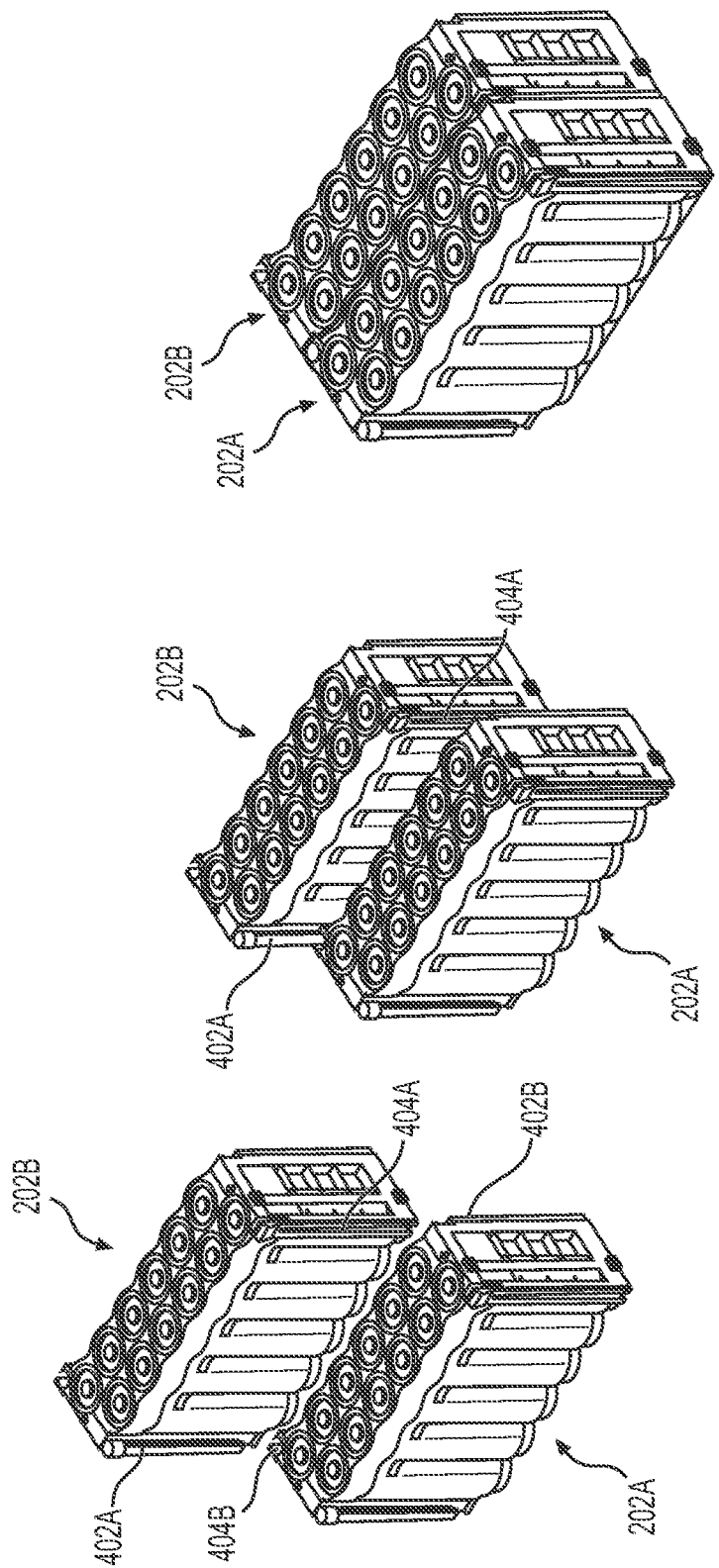
Figure 7C:
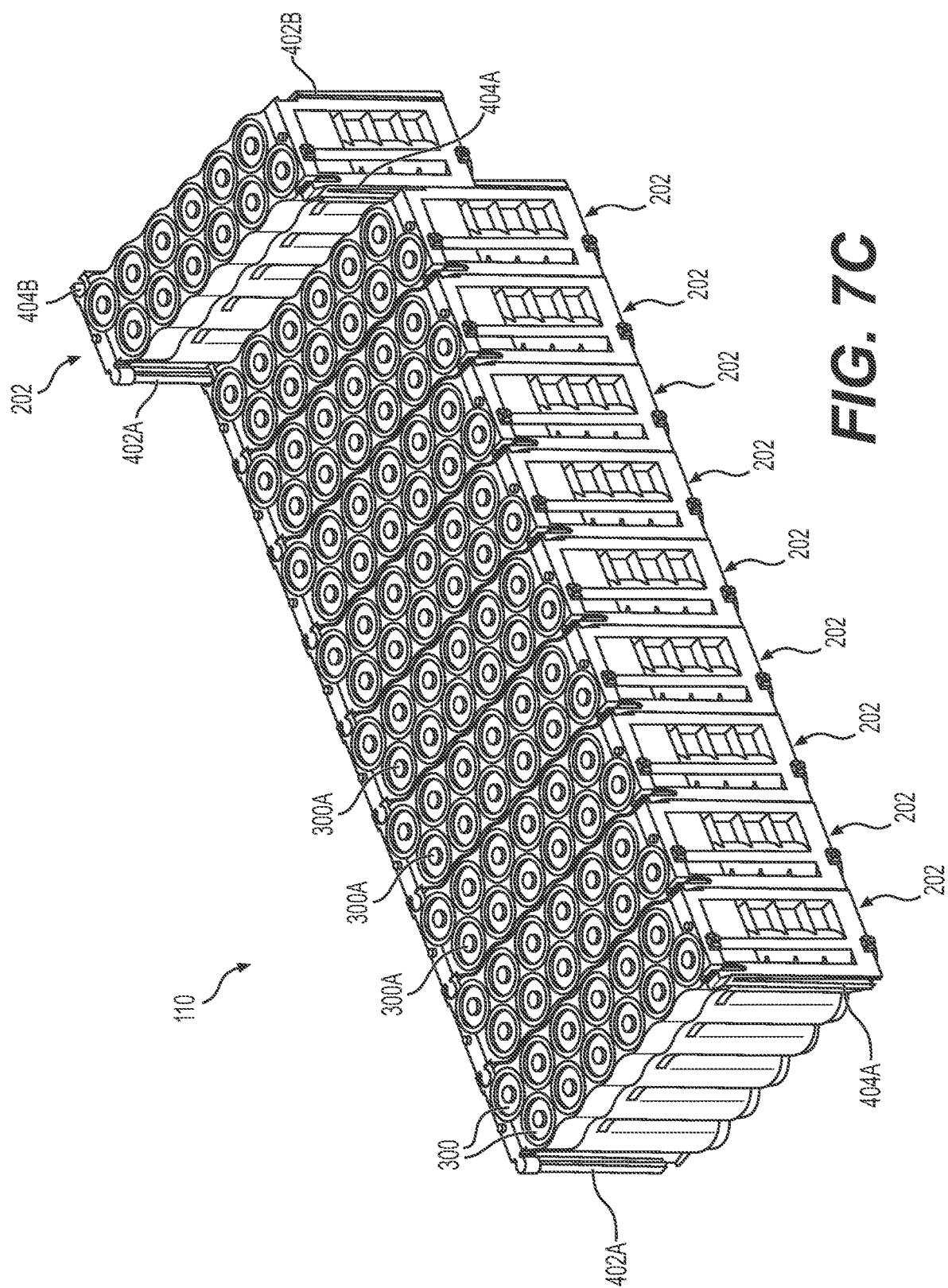

FIGS. 7A-7C depict the assembly of the exemplary battery cassette array 110 of block 102 (see FIG. 1B) according to some embodiments. As noted above, battery cassette array 110 may include one or more battery cassettes 202 coupled together. FIG. 7A depicts a plurality of battery cells 300 being inserted into the exemplary cassette 202. For example, the battery cells 300 may be inserted into tubes 208, 212 from the bottom end 12 of cassette 202. When inserted and mounted, the battery cells 300 are oriented such that the positive terminal 300A of each battery cell 300 is aligned in the same direction. Accordingly, the negative terminal 300B of the battery cells 300 are also aligned in the same direction. The aligned battery cells 300 are then inserted into cassette 202 (e.g., frame 204 of cassette 202) to securely hold the battery cells 300 in place and form a cassette 202.

FIG. 7B shows two cassettes 202A, 202B being coupled together, according to an embodiment of the present disclosure. As shown in FIGS. 2A-2B and 7B, the exterior surface of the cassettes 202A, 202B are contoured, or include features, to enable one cassette 202A to mate, engage, and couple with (e.g., removably couple with) another cassette 202B. For example, the exterior surface of the frame 204 and seal component 206 of one cassette 202A may include grooves, or other features, that correspond with features on the exterior surface of frame 204 and seal component 206 of a second cassette 202B. These mating features allow the two cassettes 202A, 202B to align and couple with each other such that a battery block 102 (see FIG. 7C) is formed with the battery cells 300 in the cassettes 202 oriented and aligned as desired. In some embodiments, the cassettes 202A, 202B slide together in the tongue 402A, 402B and groove 404A, 404B configuration with snap-fit final engagement, as detailed above. For example, tongue 402A of cassette 202B may be slid into groove 404B of cassette 202A. Likewise, groove 404A of cassette 202B may be slid into tongue 402B of cassette 202A. The cassettes 202A, 202B are removably coupled to each other such that they can be coupled to each other and separated from each other using their mating engagement features. Multiple cassettes 202 are joined together in a similar manner to form battery cassette array 110, as shown in FIG. 7C. In the embodiment illustrated in FIG. 7C, ten (10) cassettes 202, with twelve (12) battery cells 300 each, are joined together to form cassette array 110. However, this is only exemplary. In general, a cassette 202 may support any number of battery cells 300, and any number of cassettes 202 may be coupled together (as described above) to form blocks 102 with different energy capacities. Adding additional cassettes 202 to array 110 increases the energy capacity of the cassette array 110. The voltage output (and consequently the current output) of a cassette array 110 can also be varied independent of its energy capacity by changing the number of cassettes 202 that are connected together in parallel, and the number of parallel-connected cassettes 202 connected together in series.

As can be seen in FIG. 7C, the positive terminal 300A of each battery cell 300 of block 110 is oriented in the same direction thus enabling the opposite negative terminal 300B (not seen in FIG. 7C) of the cells 300 to contact a cooling plate (not shown). The ability to easily add on multiple cassettes 202 to form battery cassette array 110 (and add additional cassettes 202 to the array 110 to extend the block 102) enables the energy and voltage of a battery module (formed from block 102) to be scaled in a flexible manner. After the cassette array 110 with the desired number of cassettes 202 is formed, a block 102 (see FIGS. 1A and 1B) may be formed by assembling the positive and negative conductive foils 112, 114 and the ECPs 104, 106, 108A, 108B, etc. with the cassette array 110. The number of ECPs, specifically the number of inner spanner ECPs 108A, 108B, etc. may be adjusted according to the number of cassettes 202 included in the battery block 110 and the desired energy and voltage.

As shown in the embodiments above, the voltage and energy provided by the battery blocks 110 may be independently scaled as desired. For example, the voltage provided by the battery block 110 shown in FIG. 1A may be scaled from 12V to 36V simply by providing a different configuration for ECPs (and foils). Further, the positive and negative foils may be provided based on the configuration of ECPs. As is well known, more battery cells indicate more energy. As such, if a certain voltage is required, yet a high level of energy is not necessary, several cassettes 202 may be removed from the battery block 110. In such instances, the appropriate exterior collector plates, in addition to the appropriate positive and negative foils, may be applied to the obtained battery cassette array 110 for required voltage at the desired energy level. Thus, with the described architecture, the battery modules and battery packs are both scalable in voltage and energy independently. Being able to scale at both levels (voltage and energy) allows for the battery pack size to be tailored to the application and available space in the chassis for mounting batteries.

The ability to scale the battery pack and battery module independently for energy and voltage allows for the pack size to be more easily tailored to the application and available space in the chassis for mounting batteries. For example, while a heavy duty vehicle (such as a bus) may need a battery pack with a low output voltage relative to the energy storage needs (to provide the required range), a lighter vehicle (e.g., a light truck, car, etc.) may need a battery pack with a higher output voltage relative to the energy storage needs to meet the required range. The disclosed cassette 202 can enable these different applications by sub-dividing the battery module (using different ECPs and foils) into different number and size of bricks (i.e., the number of cassettes 202 that are connected together in parallel) to provide the needed voltage. The ability to easily reconfigure a battery pack for different applications using the same base building blocks increases operational and engineering efficiency while reducing time to market and saving money on validation and capital equipment costs.

Further, the cassette 202 of the present disclosure may enable the battery cells 300 to be safely packaged together. For example, the tubes 208 of frame 204 may provide separation between adjacent battery cells 300. Accordingly, if a battery cell 300 experiences a thermal runaway event, ruptures, or otherwise fails, frame 204 may provide protection to the other battery cells 300 to help prevent the damage from spreading and causing other battery cells 300 in the cassette 202 from failing. The tubes 208 of frame 204 may provide separation between adjacent battery cells 300. The materials, colors, and design of frame 204 and seal component 206 may also help prevent, or otherwise reduce, conductive, convective, and/or radiation heat transfer. For example, the gap 222 between tubes 208 of frame 204 and the battery cells 300 may allow a thermally-insulating column of air for preventing or reducing conduction heat transfer. The seal component 206 (e.g., silicone or other elastomers) may help to prevent or reduce convective heat transfer by forming a gas-tight seal with battery cells 300. Further, opaque materials of the frame 204 and/or the seal component 206 may help to prevent or reduce radiation heat transfer.

A number of features of cassette 202 may also help to reduce overall size and weight of cassette 202. For example, ribs 211 may enable less material to be used while maintaining structural support of cassette 202. Further, material selection (e.g., thermoplastics and elastomers) may also help to reduce weight.

While principles of the present disclosure are described herein with reference to an exemplary design of a cassette 202, a person of ordinary skill in the art would readily recognize that many variations can be made to the design of the cassette 202. For example, the cassettes of the current disclosure may support any number and type of battery cells.

Any number of cassettes 202 may be coupled together to form a battery module. And, any type of mating features may be used to couple adjacent cassettes 202 together. Further, although the battery system of an electric bus is described, it should be understood that the disclosure is not limited thereto. Rather, the systems described herein may be employed in the batteries of any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A battery cassette, comprising:
   a frame including one or more hollow tubes; and
   a seal component having one or more hollow tubes aligned with the hollow tubes of the frame, wherein the frame and the seal component are configured to receive one or more battery cells in the aligned hollow tubes of the frame and the seal component;
   wherein a material of the frame is different than a material of the seal component, and wherein the frame includes a rigid material and the seal component includes a compliant material.

2. The battery cassette of claim 1, wherein the seal component is configured to secure the battery cells in the battery cassette.

3. The battery cassette of claim 2, wherein each hollow tube of the seal component include an internal circumferential protrusion that is configured to engage with a mating recess in a battery cell.

4. The battery cassette of claim 1, wherein each hollow tube of the frame circumferentially surrounds a respective battery cell.

5. The battery cassette of claim 1, wherein each hollow tube of the frame is configured such that a circumferential air-gap is formed between an inner wall of the tube and an outer wall of a battery cell when the battery cell is received in the hollow tube.

6. The battery cassette of claim 1, wherein the rigid material is a thermoplastic.

7. The battery cassette of claim 1, wherein the frame and the seal component are formed by a molding process, and wherein the frame and the seal component are formed by overmolding.

8. The battery cassette of claim 1, further comprising one or more mating features for mating two or more battery cassettes together.

9. The battery cassette of claim 8, wherein the one or more mating features include one or more tongues and one or more grooves.

10. The battery cassette of claim 9, wherein the tongues and grooves include snap-fit features.

11. The battery cassette of claim 1, further including one or more protrusions located on a side and/or an end of the battery cassette.

12. The battery cassette of claim 1, further including one or more snap-fit features located on a side and/or an end of the battery cassette.

13. A battery cassette, comprising:
   a frame including one or more hollow tubes; and a seal component having one or more hollow tubes aligned with the hollow tubes of the frame, wherein the frame and the seal component are configured to receive one or more battery cells in the aligned hollow tubes of the frame and the seal component;

wherein the frame includes a flame-retardant material and/or glass fibers, and wherein the seal component includes a thermoplastic elastomer.

14. A battery cassette, comprising:

a frame including one or more hollow tubes; and a seal component having one or more hollow tubes aligned with the hollow tubes of the frame, wherein the frame and the seal component are configured to receive one or more battery cells in the aligned hollow tubes of the frame and the seal component;

one or more mating features for mating two or more battery cassettes together, wherein the one or more mating features include one or more tongues and one or more grooves, wherein the tongues and grooves extend substantially an entire height of the battery cassette.

15. A battery cassette, comprising:

a frame including one or more hollow tubes;

a seal component having one or more hollow tubes aligned with the hollow tubes of the frame, the hollow tubes of the frame and the seal component configured to receive one or more battery cells, wherein the battery cassette circumferentially surrounds each battery cell along substantially an entire length of each battery cell wherein the frame includes a rigid material and the seal component includes a compliant material.

16. The battery cassette of claim 15, wherein the frame and the seal component each include at least two rows of hollow tubes, and wherein the rows of hollow tubes are offset from each other.

17. A battery cassette, comprising:

a frame configured to support a plurality of similarly oriented cylindrical battery cells therein, wherein an external surface of the frame includes,
  (a) one or more first mating features configured to engage with corresponding mating features on a frame of a second battery cassette to removably couple the battery cassette to the second battery cassette, and
  (b) one or more second mating features configured to engage with corresponding mating features on an electrically conductive plate that is configured to electrically couple the battery cassette to the second battery cassette;

wherein the one or more first and/or second mating features include one or more tongues and one or more grooves;

wherein the tongues and grooves extend substantially an entire height of the battery cassette.

18. The battery cassette of claim 17, wherein the one or more first mating features of the battery cassette include the one or more tongues configured to engage with a correspondingly shaped one or more grooves of the second battery cassette.

19. The battery cassette of claim 17, wherein the frame includes a plurality of hollow tubes that extend from a top surface of the frame to a bottom surface of the frame, wherein each hollow tube of the plurality of hollow tubes is configured to receive a battery cell therein.

* * * * *